United States Patent [19]
Watanabe et al.

[11] Patent Number: 5,245,688
[45] Date of Patent: Sep. 14, 1993

[54] FIBER RETAINING STRUCTURE FOR PHOTOELECTRIC SENSOR

[75] Inventors: Hironobu Watanabe; Hiroshi Ishikawa, both of Furukawa, Japan

[73] Assignee: Alps Electric Co., Ltd., Tokyo, Japan

[21] Appl. No.: 988,991

[22] Filed: Dec. 10, 1992

[30] Foreign Application Priority Data

Dec. 18, 1991 [JP] Japan .................................. 3-110764

[51] Int. Cl.⁵ .......................... G02B 6/00; G02B 6/36
[52] U.S. Cl. .................................................. 385/137
[58] Field of Search ............... 385/134, 135, 136, 137, 385/138, 139

[56] References Cited

U.S. PATENT DOCUMENTS

| | | | |
|---|---|---|---|
| 3,954,542 | 5/1976 | Solomon et al. | 156/360 |
| 4,515,434 | 5/1985 | Margolin et al. | 385/137 |
| 4,614,398 | 9/1986 | Wright et al. | 339/143 R |
| 4,789,292 | 12/1988 | Holcomb | 414/226 |
| 4,935,634 | 6/1990 | Hansma et al. | 250/560 |

*Primary Examiner*—Akm E. Ullah
*Attorney, Agent, or Firm*—Guy W. Shoup; Patrick T. Bever

[57] ABSTRACT

A fiber retaining structure is disclosed for readily and reliably mounting and retaining optical fibers on a casing in which a light-emitting element and a light-receiving element are incorporated. The fiber retaining structure includes a first link 61 for moving both a second link 26 for crashing O-rings with optical fibers 2 and 3 inserted therethrough against a casing 24 in which a light-emitting element 6 and a light-receiving element 7 are incorporated and holders 27 and 28 for holding the optical fibers when a lever 29 is pushed down, and a spring material. Since the inner diameter of a sealing material for sealing a gap around the optical fiber is set substantially equal to the outer diameter of the optical fiber and since the holding of the optical fibers by the entire holders is performed separately, the distal ends of the optical fibers can be readily and reliably brought into abutment with the light-emitting element and the light-receiving element and the optical fibers can be reliably retained.

1 Claim, 6 Drawing Sheets

FIBER RETAINING STRUCTURE FOR PHOTOELECTRIC SENSOR

BACKGROUND OF THE INVENTION

1. Field of the Invention

The present invention relates to a fiber retaining structure for a photoelectric sensor which is provided on a casing in which a light-emitting element and a light-receiving element are incorporated to retain optical fibers respectively connected to the light-emitting element and the light-receiving element.

2. Description of the Related Art

FIG. 8 illustrates an example of a photoelectric sensor. FIG. 9 is a cross-sectional view of a conventional fiber retaining structure provided on the photoelectric sensor.

As shown in FIGS. 8 and 9, a photoelectric sensor generally includes a body 1, a pair of optical fibers 2 and 3, and a detection head 4 connected to the body 1 via the optical fibers 2 and 3. The body 1 has a casing 5 in which a light-emitting element 6 and a light-receiving element 7 are incorporated, as shown in FIG. 9. The optical fibers 2 and 3 are connected to the light-emitting element 6 and the light-receiving element 7, respectively. In the photoelectric sensor arranged in the manner described above, when the light-emitting element 6 emits light, the emitted light is introduced to the detection head 4 via the optical fiber 2 and is then projected therefrom. If an object 8 exists at a position which opposes the detection head 4, the projected light is reflected by the object 8. The detection head 4 receives the reflected light, and sends it to the light-receiving element 7 via the optical fiber 3 to detect it.

A conventional fiber retaining structure for retaining the optical fibers 2 and 3 includes O-rings 9 into which the optical fibers 2 and 3 are inserted, holding members 10, 11, 12, a connection casing 13 in which the holding members 10, 11, 12 are incorporated, and a tightening screw 14 threaded into the connection casing 13 to press against the holding member 10.

The O-rings 9 are sealing materials which seal the gap around each of the optical fibers 2 and 3 and thereby prevent entry of the water contents into the casing 1. Therefore, the inner diameter of each of the O-rings 9 is smaller than the outer diameter of each of the optical fibers 2 and 3.

In such a conventional fiber retaining structure, the optical fiber 2 is connected to, for example, the light-emitting element 6 in the manner described below. First, the operator holds the optical fiber 2 by his or her hand, and then inserts it into an insertion hole 15 in the connection casing 13.

Consequently, the optical fiber 2 passes through a gap between the holding members 11 and 12 and then through the O-ring 9 while expanding it, and the distal end thereof abuts against the light-emitting element 6. At that time, the operator has a feeling and a confirmation that the distal end of the optical fiber 2 has made contact with the light-emitting element 6 and thus stops pushing in the optical fiber 2. The optical fiber 3 is similarly connected to the light-receiving element 7.

Next, the operator screws the tightening screw 14 with a tool, such as a screw driver. As the distal end of the tightening screw 14 presses against the holding member 10, the optical fiber 3 is held between the holding members 10 and 11 while the optical fiber 2 is held between the holding members 11 and 12, whereby the optical fibers 2 and 3 are retained in a connecting state to the light-emitting element 6 and the light-receiving element 7, respectively. The gap around each of the optical fibers 2 and 3 is sealed by the O-ring 9 so as to prevent entry of the water contents into the casing 1.

In the above-described conventional fiber retaining structure for the photoelectric sensor, since the inner diameter of each of the O-rings 9 is smaller than the outer diameter of each of the optical fibers 2 and 3, when the optical fiber 2, for example, is pushed into the O-ring 9, it expands the O-ring 9 and generates a friction: it is not easy to insert the optical fiber 2 into the O-ring 9.

It is therefore difficult for the operator to have a feeling and hence a confirmation that the distal end of the optical fiber 2 has abutted against the light-emitting element 6 when the optical fiber 2 is pushed in. When the distal end of the optical fiber 2 is not reliably abutted against the light-emitting element 6, the gap between the distal end of the optical fiber 2 and the light-emitting element 6 easily varies. Generation of the gap between the end portion of the optical fiber 2 and the light-emitting element 6 reduces the transmission efficiency of the light from the light-emitting element 6 to the optical fiber 2. A similar problem occurs when the other optical fiber 3 is inserted. Furthermore, when an unskilled operator screws the tightening screw 14 after the distal ends of the optical fibers 2 and 3 have made contact with the light-emitting element 6 and the light-receiving element 7, there is the possibility that the operator may apply an extra force: it is difficult for the operator to apply a proper amount of force.

In addition, the optical fiber retaining process is divided into the optical fiber insertion process and the optical fiber fixing process, and hence has a deteriorated working efficiency.

Furthermore, after the photoelectric sensor in which the optical fibers 2 and 3 are held by the holding members 10 through 12 has been used for a long period of time, the holding force for the optical fibers 2 and 3 may weaken due to the permanent set of the holding members 10 through 12.

SUMMARY OF THE INVENTION

In view of the aforementioned problems of the prior art, an object of the present invention is to provide a fiber retaining structure for a photoelectric sensor which enables easy and reliable mounting of an optical fiber into a casing, and which enables reliable holding of the optical fiber by a fixed amount of holding force while maintaining the compressive force of a sealing member for sealing the optical fiber.

To achieve the above-described object, the present invention provides an optical fiber retaining structure for a photoelectric sensor which is provided on a casing with a light-emitting element and a light-receiving element incorporated therein to retain the optical fiber inserted into through-holes formed in a partitioning portion of the casing and connected to the light-emitting element and the light-receiving element, respectively, which comprises a pivotal lever, a first link engaged with the lever and movable in a direction perpendicular to the direction of insertion of the optical fiber when the lever is pivoted, a ring-shaped sealing material mounted on each of the optical fibers on the outside of the partitioning wall portion, a second link provided together with the first link and pressed by the first link when the first link is moved in one direction for pressing the ring-shaped sealing materials against the partitioning wall portion, an engaging surface portion formed in the first link and extending along the direction in which the first link is moved, a spring member retained on the casing and engaged with the engaging surface portion of the first link, and a pair of holders enclosed by the spring member and holding the optical fibers.

The spring member is pressed by the engaging surface portion of the first link when the first link is moved in one direction to urge the holders in a direction which ensures that the holders hold the optical fibers.

In the optical fiber retaining structure for the photoelectric sensor according to the present invention, when the lever is operated with one end of each of the optical fibers inserted into the casing, the first link is moved in a direction perpendicular to the direction in which the optical fibers are inserted, moving the spring member in a direction perpendicular to the direction in which the optical fibers are inserted. Therefore, the spring member is deformed such that it pushes the holders enclosed by the spring member inwardly, and the holders thus hold the optical fibers disposed therebetween.

Also, the first link moves the second link provided together with the first link in one direction parallel to the direction in which the optical fibers are inserted. Therefore, the ring-shaped sealing material with the optical fibers inserted thereinto are crashed in a direction in which the inner diameter thereof decreases.

The optical fibers connected to the light-emitting element and the light-receiving element are held by the holding members and sealed by the sealing materials crashed around the optical fibers.

Furthermore, when the first link is moved in one direction, the spring member is pressed by the engaging surface portion extending in the longitudinal direction of the first link by a fixed force and thereby urges the holders by the fixed force. Therefore, the optical fibers can be reliably retained by the holders by the fixed force.

BRIEF DESCRIPTION OF THE DRAWINGS

FIG. 7 (b) is a section taken along the line D—D' of FIG. 6;

DETAILED DESCRIPTION OF THE PREFERRED EMBODIMENT

An embodiment of a fiber retaining structure for a photoelectric sensor according to the present invention will be described below with reference to FIGS. 1 through 7.

Figure 6:
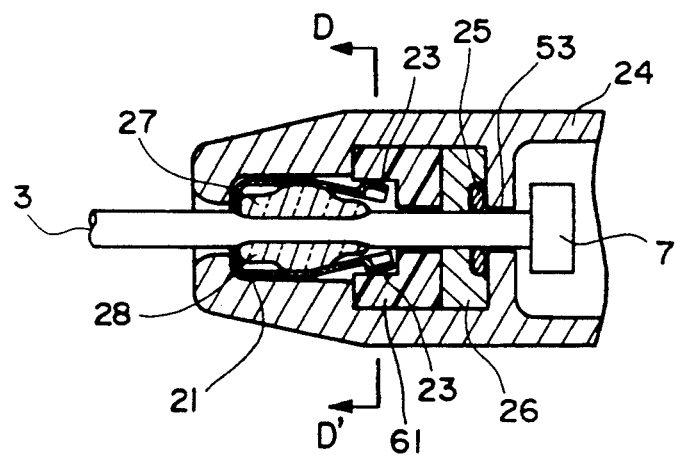
FIG. 6 is a cross-section taken along the line B—B' of FIG. 2 when the optical fibers are fixed.
Figure 7A:
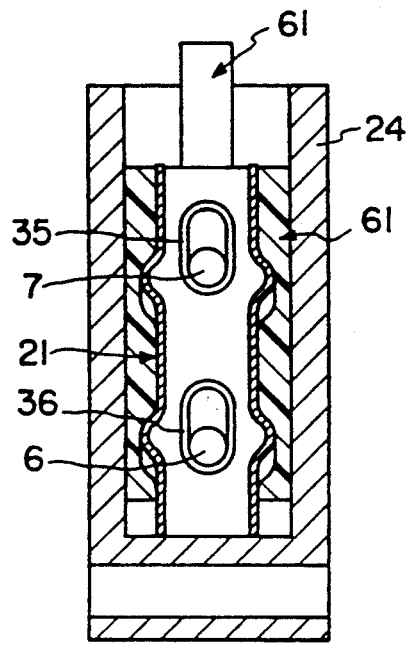
FIG. 7 (a) is a section taken along the line C—C' of FIG. 5.
Figure 7B:
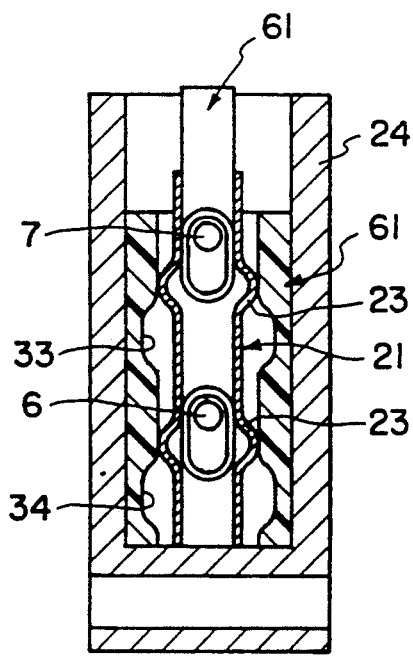
Figure 8:
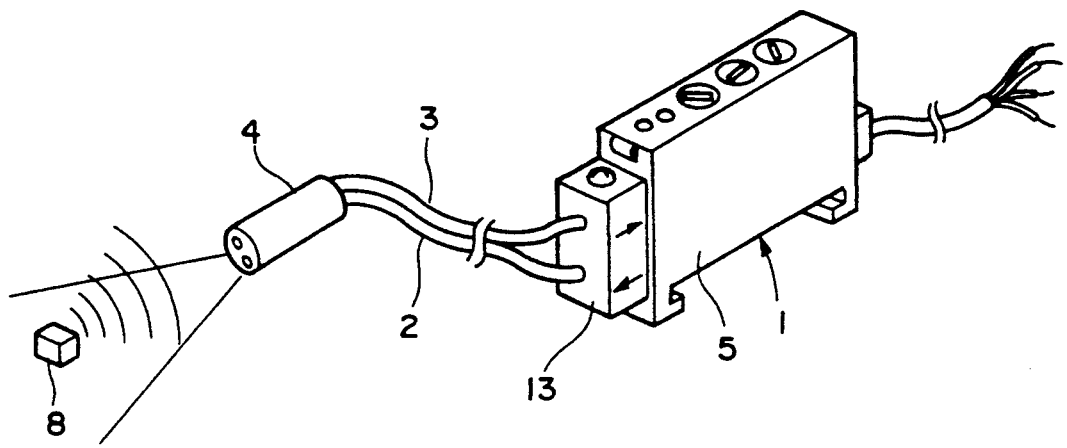
FIG. 8 illustrates an example of a photoelectric sensor.
Figure 9:
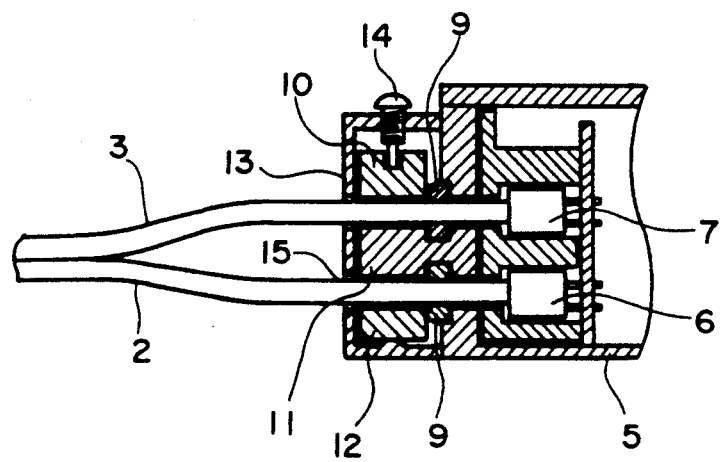
FIG. 9 is a cross-sectional view showing a conventional fiber retaining structure provided in the photoelectric sensor shown in FIG. 8.

Reference numerals in FIGS. 1 through 7 were used previously in FIGS. 8 and 9 and represent similar or identical elements.

Figure 1:
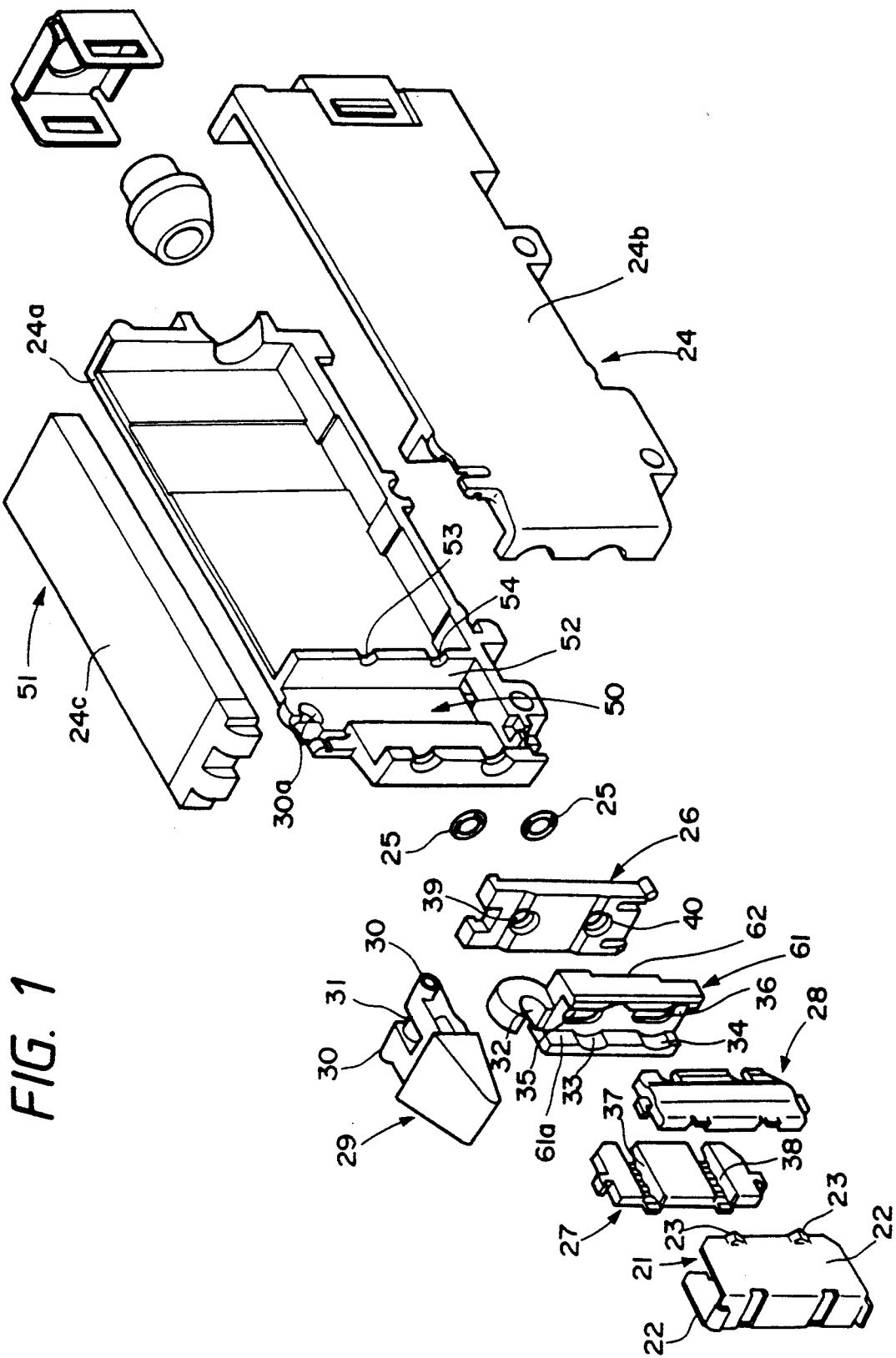
FIG. 1 is an exploded perspective view of a fiber retaining structure for a photoelectric sensor showing an embodiment of the present invention.
Figure 2:
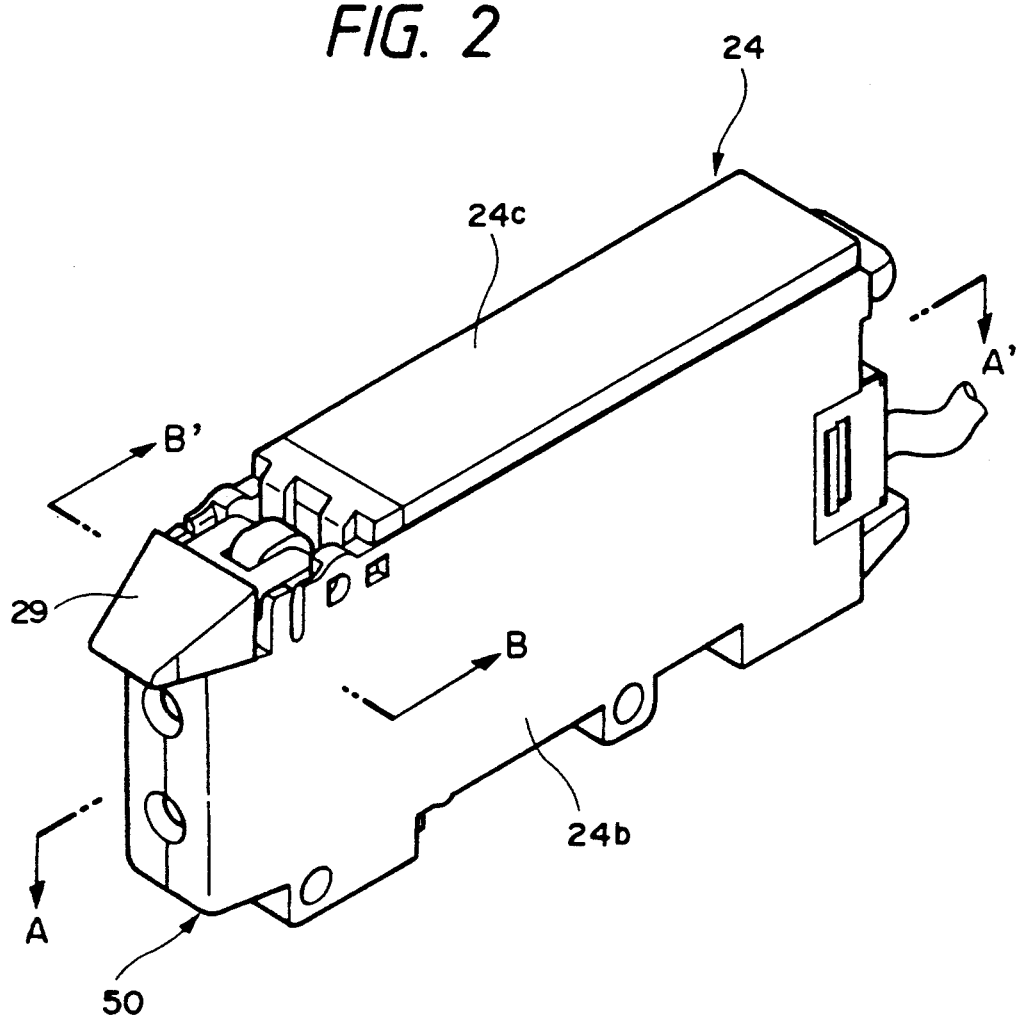
FIG. 2 is a perspective view of the photoelectric sensor which is in an assembled state.

A photoelectric sensor shown in FIGS. 1 and 2 includes a body 51, a pair of optical fibers 2 and 3 (see FIGS. 3 through 7), and a detection head (not shown) coupled to the body 51 via the optical fibers 2 and 3.

A light-emitting element 6 and a light-receiving element 7 are incorporated in a casing 24 of the body 51 in such a manner that they can be connected to inserted ends of the optical fibers 2 and 3, respectively.

An optical fiber retaining structure provided in such a photoelectric sensor will be described below.

Figure 3:
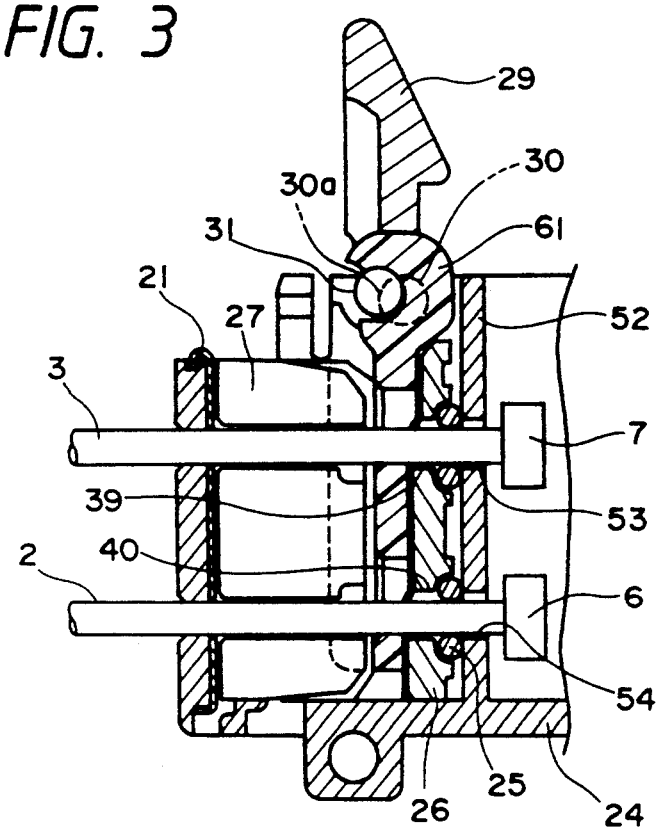
FIG. 3 is a cross-section taken along the line A—A' of FIG. 2 when the optical fibers are inserted.

As shown in FIG. 1, the casing 24 in which an optical fiber retaining portion 50 is provided includes a left side plate 24a, a right side plate 24b, and an upper plate 24c. A partitioning wall portion 52 is formed at an end portion of the casing 24. As shown in FIG. 3, the partitioning wall portion 52 separates the body portion of the photoelectric sensor, i.e., the substrate, the light-emitting element 6, the light-receiving element and so on, from the optical fiber retaining portion 50. The partitioning wall portion has through-holes 53 and 54 formed therein so as to allow the optical fibers 2 and 3 to pass therethrough.

The optical sensor retaining portion 50 includes ring-shaped sealing materials, e.g., O-rings, 25 through which the optical fibers 2 and 3 are inserted, a second link 26 provided on the casing 24 in such a manner as to be movable in a direction parallel to the direction in which the optical fibers 2 and 3 are inserted (in a horizontal direction in this embodiment) for crashing the O-rings 25 with the optical fibers 2 and 3 inserted therethrough, a lever 29 pivotally mounted on the casing 24 through crank shaft portions 30 thereof, and a first link 61 which is movable in a direction perpendicular to the direction of the insertion of the optical fibers 2 and 3 (in a vertical direction in this embodiment) in response to the pivot of the lever 29.

The lever 29 has a crank portion 31 for supporting a supporting portion 32 of the first link 61, which will be described later, and the crank shaft portions 30 supported by the left side plate 24a dn the right side plate 24b. A pair of bearing portions 30a and 30b protrude from the two side surfaces of the casing 24 to receive the crank shaft portions 30.

The first link 61 has a recessed portion 61a extending along the direction of the movement thereof. Notches 33 and 34 are formed on the opposing inner side surfaces of the recessed portion 61a.

The first link 61 incorporates therein holders 27 and 28 for respectively holding the optical fibers 2 and 3, and a spring member 21 for enclosing the holders 27 and 28. The spring member 21 has protrusions 23 formed on each of two side pieces 22 thereof. The protrusions 23 make abutment with the notches 33 and 34 formed on the inner side surfaces of the recessed portion 61a of the first link 61.

Each of the holders 27 and 28 has elongated grooves 37 and 38 to hold the optical fibers.

The supporting portion 32 of the first link 61 is pivotally supported by the lever 29. The first link 61 has first round holes formed therein to insert the optical fibers therethrough, and a side surface 62 corresponding to the shape of the second link 26.

As shown in FIG. 1, the second link 26 has second round holes 39 and 40 formed therein to insert the optical fibers therethrough. Each of the second round holes 39 and 40 has a ring-shaped groove (not shown) in which the O-ring 25 is to be placed at the end portion on the side thereof which is close to the partitioning wall portion 52.

The inner diameter of the O-ring 25 is substantially equal to the outer diameter of the optical fibers 2 and 3.

The assembly procedures of the optical fiber retaining structure according to the present invention will be described with reference to FIGS. 3 through 7.

Figure 5:
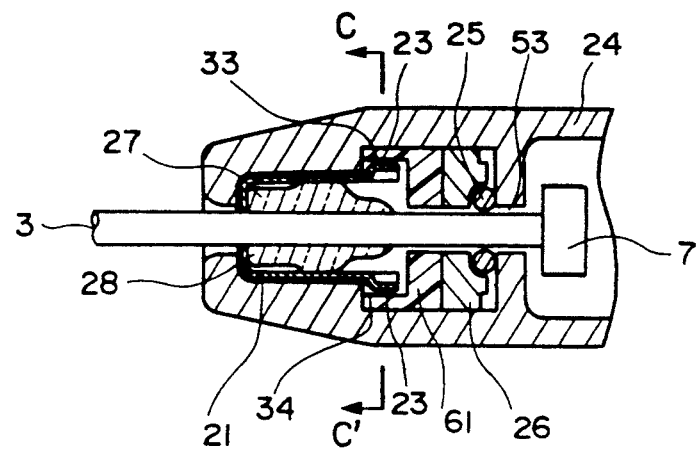
FIG. 5 is a cross section taken along the line B—B' of FIG. 2 when the optical fibers are inserted.

FIGS. 3, 5 and 7 (a) are respectively cross-sectional views illustrating the optical fiber inserting operation.

Figure 4:
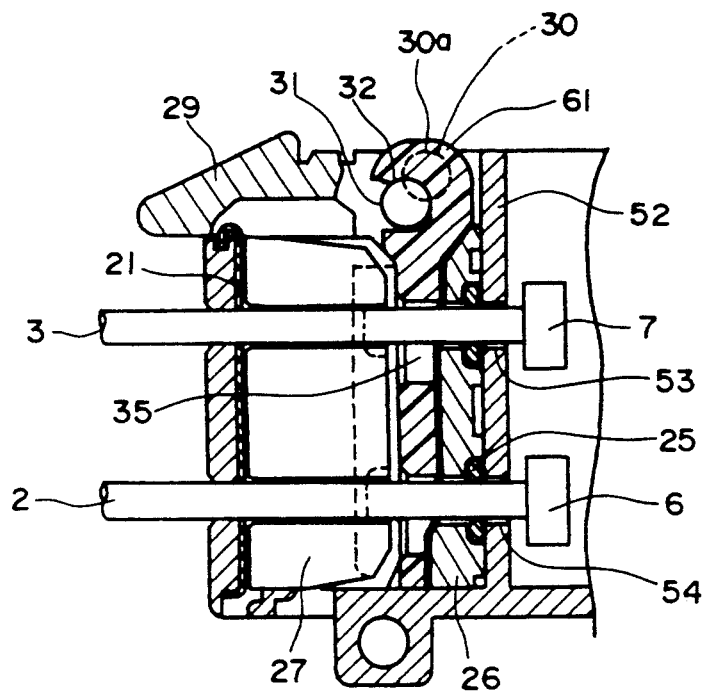
FIG. 4 is a cross-section taken along the line B—B' of FIG. 2 when the optical fibers are fixed.

FIGS. 4, 6 and 7 (b) are respectively cross-sectional views illustrating the optical fiber fixing operation. FIGS. 3 and 4 are respectively cross-sections taken along the line A—A' of FIG. 2. FIGS. 4 and 6 are respectively cross-sections taken along the line B—B' of FIG. 2.

FIGS. 7 (a) and 7 (b) are respectively cross-sections taken along the line C—C' of FIG. 5 and the line D—D' of FIG. 6.

As shown in FIGS. 3 through 7, the O-rings 25 are mounted in the second round holes 39 and 40 formed in the second link 26, and then the crank portion 31 of the lever 29 is meshed with the first link 61 provided together with the second link 26.

The pair of holders 27 and 28 covered with the spring member 21 are brought into engagement with the first link 61. Thereafter, the optical fiber retaining member, i.e., the O-rings 25, the first link 61, the second link 26, the holders 27 and 28 and the spring member 21, is incorporated into the left side plate 24a and the right side plate 24b of the casing 24 in such a manner that the crank shaft portions 30 of the lever 29 are brought into engagement with the bearing portions 30a, and then the upper plate 24c is covered, whereby assembly of the body 51 is completed.

Next, the optical fibers 2 and 3 are inserted from the round holes formed in the side surface of the body 51 and are then brought into abutment with the light-emitting element 6 and the light-receiving element 7. After the feeling that the optical fibers 2 and 3 have made abutment with the light-emitting element 6 and the light-receiving element 7 has been obtained, the lever 29 is pivoted about the crank shaft portions 30 thereof such that it is pulled down toward the side of the casing 24 from which the optical fibers are inserted, i.e., such that the posture of the lever 29 changes from the state shown n FIG. 3 to the state shown in FIG. 4.

At that time, the optical fiber retaining structure is operated in the manner described below with reference to FIGS. 7 (a) and 7 (b).

First, as the lever 29 is pushed down, the first link 61 is pushed down by means of the crank portion 31 having the crank mechanism of the lever 29, thus pushing down the protrusions 23 of the spring member 21 which are in engagement with the notches 33 and 34 of the first link 61.

As the lever 29 is further pushed down, the protrusions 23 of the spring member 21 are disengaged from the notches 33 and 34 and are pressed against the side surfaces of the recessed portion 61a of the first link 61, as shown in FIG. 7 (b).

When the side pieces 22 of the spring member 21 are pressed inwardly, the holders 27 and 28 enclosed by the spring member 21 hold the optical fibers 2 and 3 by the pressing force of the spring member 21.

At the same time, the second link 26 is pushed by a side surface 62 of the first link 61 and is thereby moved in the direction in which the optical fiber is inserted, i.e., toward the partitioning wall portion 52.

As the lever 29 is further pushed down, the O-rings 25 are compressed by the second link 26 and the partitioning wall portion 52 and thereby attach to the entire outer peripheral surfaces of the optical fibers 2 and 3 and the outer wall surface of the partitioning wall portion 52 to seal gaps between the optical fibers 2 and 3 and the through-holes 53 and 53 of the partitioning wall portion 52 and thereby prevent entry of the water contents into the casing 24. The aforementioned series of operations are accomplished only by pivoting the lever 29.

In the thus-arranged present embodiment, since the inner diameter of the O-ring 25 is substantially equal to the outer diameter of the optical fibers 2 and 3, when the optical fibers 2 and 3 are pushed in, no friction is given to the optical fibers 2 and 3. Thus, it is possible to smoothly insert the optical fibers 2 and 3 by a small amount of force. In addition, since it is possible for the operator to have a feeling that the distal ends of the optical fibers 2 and 3 have made contact with the light-emitting element 6 and the light-receiving element 7, he or she can confirm the contact of the distal ends of the optical fibers 2 and 3, and thus can suspend further pushing in of the optical fibers 2 and 3.

Since the optical fiber retaining operation is accomplished by the lever 29 alone, the optical fibers can be easily and reliably mounted. This improves the work efficiency.

Since the optical fiber retaining force of the holders 27 and 28 and the compressing force of the O-rings 25 are provided separately, even if a sleeve made of a hard material used with a fiber having a small diameter is inserted into the optical fiber retaining portion, the O-rings 25 can be compressed by an adequate force while the optical fibers 2 and 3 can be retained by the holders 27 and 28, respectively, by an adequate force.

It is possible to reliably hold the optical fibers 2 and 3 by the entirety of the holders 27 and 28 only by changing the diameter of each of the elongated grooves 37 and 38 of the holders 27 and 28. Since the sealing function of the O-rings 25 and the holding function of the holders 27 and 28 are accomplished by the two separate parts, the durability of the parts can be improved, i.e., the permanent set of the chucking, can be eliminated.

Particularly, the optical fiber holding force does not decrease even if a heat is generated from the optical fiber device.

In the thus-arranged present invention, since the inner diameter of the ring-shaped sealing member for sealing a gap around the optical fiber is substantially the same as the outer diameter of the optical fiber, a friction generated between the optical fiber and the sealing member when the optical fiber is passed through the sealing member can be reduced.

The optical fiber mounting operation is not divided into the optical fiber insertion process and the optical fiber tightening process, and can be accomplished using the lever alone. Thus, the working efficiency can be greatly improved.

In addition, the optical fibers are held by the entirety of the holders and are sealed by the sealing materials which are provided separately from the holders. Thus, the durability and the heat-resistance can be improved.

What is claimed is:

1. A fiber retaining structure for a photoelectric sensor, which is provided in a casing in which a light-emitting element and a light-receiving element are incorporated to retain optical fibers inserted into through-holes formed in a partitioning wall portion of said casing and connected to said light-emitting element and to said light-receiving element, respectively, comprising:

a pivotal lever;

a first link engaged with said lever and movable in a direction perpendicular to a direction in which said optical fibers are inserted when said lever is pivoted;

a ring-shaped sealing material mounted on each of the optical fibers on the outside of said partitioning wall portion;

a second link provided together with said first link and pressed by said first link when said first link is moved in one direction to press said ring-shaped sealing materials against said partitioning wall portion;

an engaging surface portion formed in said first link and extending along the direction in which said first link is moved;

a spring member retained on said casing and engaged with said engaging surface portion of said first link; and a pair of holders enclosed by said spring member and holding the optical fibers, wherein said spring member is pressed by said engaging surface portion when said first link is moved in one direction to urge said holders in a direction which ensures that said holders hold the optical fibers.

* * * * *